Nov. 1, 1932.　　　C. H. PORTER　　　1,885,139
REFRIGERATING APPARATUS
Filed Jan. 30, 1929　　　2 Sheets-Sheet 1
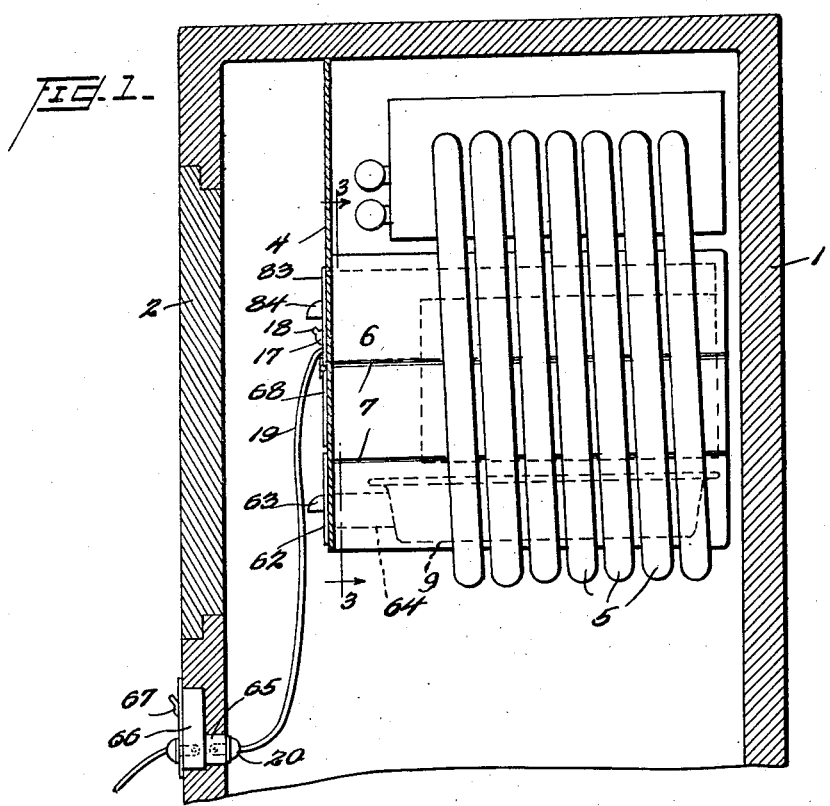
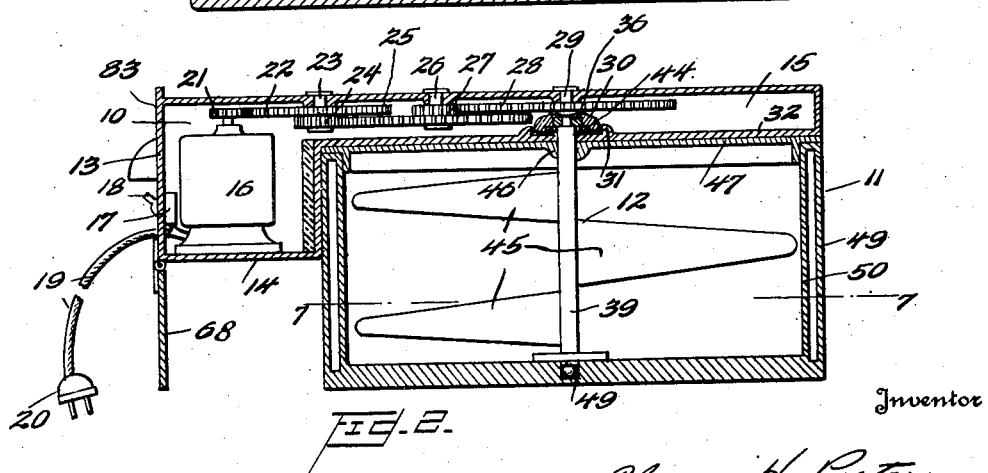
Inventor
Clarence H. Porter

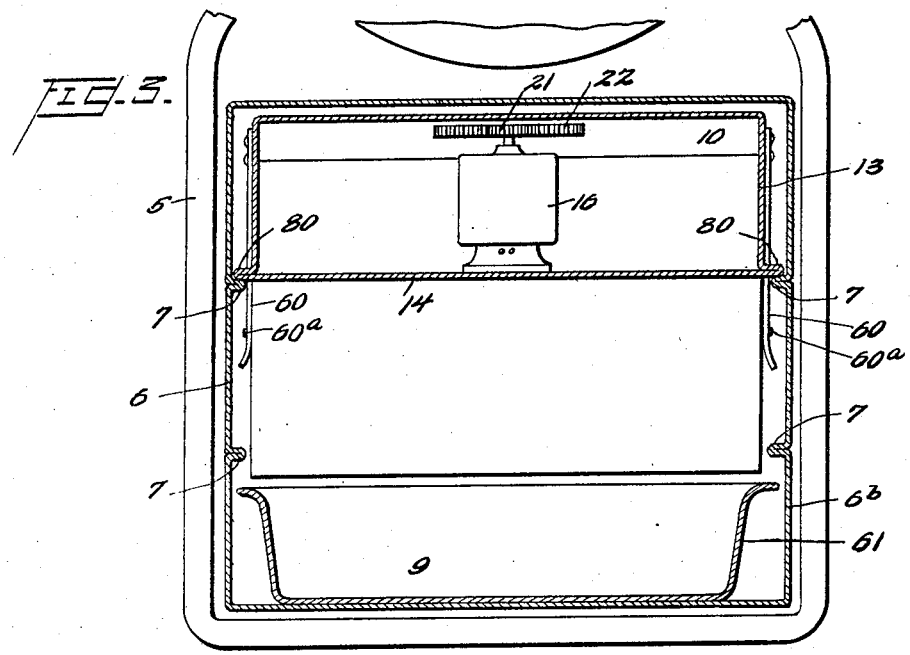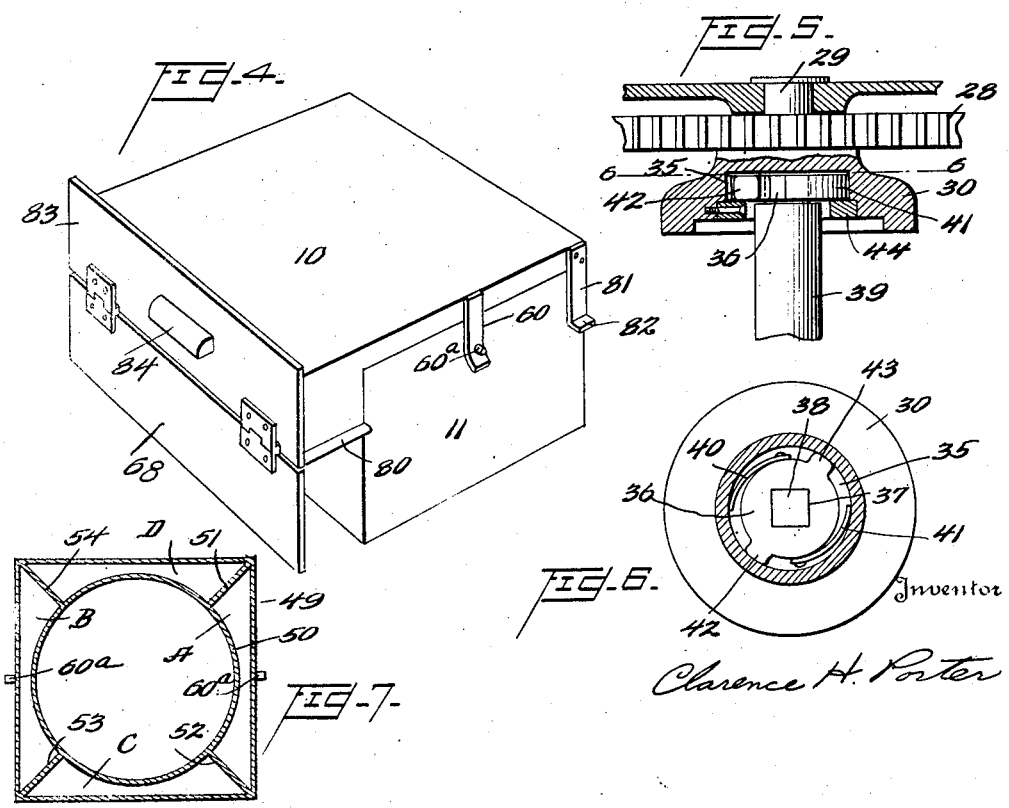

Patented Nov. 1, 1932

1,885,139

UNITED STATES PATENT OFFICE

CLARENCE H. PORTER, OF WASHINGTON, DISTRICT OF COLUMBIA

REFRIGERATING APPARATUS

Application filed January 30, 1929. Serial No. 336,250.

The main object of this invention is to provide an apparatus for freezing desserts, such as ice creams, custards, ices, gelatines, etc.

Another object of the invention is to provide an apparatus of this kind which may be used in conjunction with the usual household electrical or mechanical refrigerator and which may be inserted into the space usually provided for the trays which are used for freezing ice cubes.

Another object is to provide an apparatus which will be motor operated to stir the substances while being frozen.

Another object is to provide an apparatus which will comprise a motor, a container for the substance to be frozen, and a stirrer in the container operated by the motor, and which will form when assembled a self-contained unit which may be inserted in the freezing space of the refrigerator and admit of the door of the refrigerator being closed while the apparatus is in operation.

Another object is to provide an apparatus which has few exposed parts, of which the container or stirrer may easily be detached for washing, and in which the substance to be frozen is effectively prevented from coming into contact with or working into the motor and driving gears.

A further object is to provide an apparatus of the kind described which when placed in the freezing space of a refrigerator will close the entrance to the freezing space and thus prevent loss in freezing efficiency through convection currents between the interior of the freezing space and the main cooling space of the refrigerator.

In the drawings:

Figure 1 is a partial sectional view through a household refrigerator, showing the evaporator unit of the refrigerator in full lines, and showing the position of the desert-freezing apparatus within the interior of the freezing space of the expander unit;

Figure 2 is a sectional view of the desert-freezing apparatus removed from the freezing space of the refrigerator;

Figure 3 is a sectional view along line 3—3 of Fig. 1, showing the expander unit of the refrigerator with the dessert-freezing apparatus in freezing space of the evaporator unit;

Figure 4 is a perspective view of the dessert-freezing apparatus, removed from the refrigerator;

Figure 5 is a view on an enlarged scale, partly in section, of the clutch mechanism;

Figure 6 is a sectional view along the line of 6—6 of Fig. 5; and

Figure 7 is a sectional view of the container with the stirrer removed, taken along the line 7—7 of Fig. 2.

In the drawings, 1 represents the casing of a household refrigerator provided with a door 2, and containing the evaporator unit 4. The expander unit is provided with a plurality of refrigerant circulating coils 5 which surround and contact closely with a sheet metal box or receptacle 6 which is open at its front side, and closed on its other sides, the coils 5 serving to abstract heat from the space enclosed by the box or receptacle 6 through its walls. Referring to Fig. 3, this box 6 is provided with inwardly disposed ledges 7, each corresponding pair of which is adapted to support a removable shelf (not shown) for the purpose of supporting trays for freezing ice cubes. Figures 1 and 3 show such a tray 9.

The dessert-freezing apparatus comprises essentially a motor unit 10, a container 11 for holding the substance to be frozen, and a stirrer 12 in the container 11 but extending partially into the motor unit 10, this apparatus being adapted to be moved as a unit horizontally into or out of the receptacle or box 6. The motor unit 10 consists of a sheet metal casing 13, rectangular in plan, as may be seen in Fig. 4, and having a deepened front portion 14, and a relatively shallow rear portion 15. In the deepened front portion 14 of the motor unit are located an electric motor 16, and an electrical switch 17 connected to the motor and provided with an operating lever 18 extending out of the casing. An electric cord 19 provided with a plug connector 20 of the usual type, passes through the casing 13 and is attached to the switch 17 so as to convey electric current to the switch and motor.

The motor shaft is provided with a small pinion 21 which meshes with a large gear wheel 22 mounted on and turning with a shaft 23. A small pinion 24 is mounted on shaft 23 and meshes with a large gear wheel 25 which is mounted on and turns with the shaft 26. Another small pinion 27 is mounted on shaft 26 and meshes with a large gear wheel 28. Gear wheel 28 is mounted on a shaft 29. A cup-shaped member 30 is rigidly attached to the lower side of gear wheel 28, and the periphery of the cup-shaped member makes a sliding fit with an annular raised abutment 31 integral with the lower wall 32 of the casing.

Referring to Figs. 5 and 6, the cup-shaped member 30 is provided with a recess 35. A rotatable socket member 36 is provided with a square recess 37 for the reception of the squared head 38 of the stirring shaft 39. To the socket member 36 are attached oppositely disposed stiff springs 40 and 41 which press outwardly against the inner face of the cup-shaped member 30. This mechanism causes the socket member 36 to turn with the cup-shaped member 30 under normal conditions of operation, but enables these members to slip relatively to each other in case the stirring shaft 39 meets with extraordinary resistance to turning, as for example, if the substance being frozen should freeze hard by being left in the freezing space of the refrigerator too long. Oppositely disposed, and alternating with the springs 40 and 41, the two projections 42 and 43 on the socket member serve to assist in spacing the socket member from the inner wall of the cup-shaped member 30, and together with springs 40 and 41 serve to position the socket member centrally in the cup-shaped member. An annular member 44 fastened to the inner wall of the cup-shaped member secures the socket member in place, as shown.

The stirring shaft 39, which is detachable from the socket member 36, is provided with a plurality of blades or paddles 45. The upper portion of the stirring shaft passes through a journal 46 in the lid 47 of a container 11. The lower end of the stirring shaft is detachably supported in a bearing 49 in the bottom of the container 11.

Container 11 is formed of sheet metal with double walls 49 and 50, the outer wall 49 being rectangular and the inner wall 50 being circular in shape, as seen in Fig. 7. Vertical partition walls 51, 52, 53 and 54 divide the space between these walls into four sections A, B, C and D. Sections A and B, which are adjacent to the sides of the sides 6a of the freezing compartment box 6, are filled nearly full with brine or other heat-conducting substance which will not freeze at the temperature of the refrigerator, and are hermetically sealed. Sections C and D, at the front and rear of the container respectively, are left empty. Thus, when the dessert-freezing unit with its container, is placed in the box 6 of the freezing compartment of the refrigerator, sections A and B of the container, with their heat-conducting liquid, will facilitate the transfer of heat from the substance in the container to the inner side walls of the box 6 of the freezing compartment. In addition, compartment C, which is empty, will serve to insulate the inner cylindrical compartment of the container from the front of the refrigerator and from any heat generated by the motor 16. The fact that sections C and D are empty will also tend to make the unit lighter.

The container 11 is detachably connected to the motor unit 10 by snap fasteners 60 attached to opposite sides of the motor unit and engaging with projections 60a on the container.

It will be seen that the container 11 may readily be removed from the motor unit 10 for the purpose of filling the container, removing the substance frozen, and washing the container and stirrer. The journal 46, which is adapted to closely fit the stirring shaft 39, and the cup-shaped member 30 which is adapted to closely fit the annular abutment 31, serve to prevent any of the substance being frozen from working its way into the interior of the motor unit 10. Hence only the container 11, its lid 47, and the stirrer 12 need be washed.

Referring to Figs. 1 and 3, the tray 9, such as is ordinarily used to freeze ice cubes, is formed of a body portion 61, a front panel 62 carrying a handle 63, and a sheet metal connection 64, spacing the body portion 61 from the front panel 62. It will be noted further that the body portion 61 of the tray is of less height than the distance from the bottom of the box 6 of the expander unit to the lowest pair of ledges 7, or from one pair of ledges 7 to the next higher pair, while the front panel 62 is of a height sufficient to extend up to the ledges 7. I prefer to utilize this fact to increase the size of the container 48, by making container 48 of sufficient depth to extend somewhat below the ledges 7 which are adjacent its bottom, and extend down to almost touch the top of the contents of the tray 9, without interfering with the front panel 62 of the tray.

It will be understood that containers of different depths may be used with the same motor unit, the depth of the container being limited by the height of the box 6 of the expander unit. While I have shown a motor unit and container in a three tray refrigerator, it is obvious that they may be used in a refrigerator having only space for one tray by using a container which does not extend below the bottom 14 of the motor unit. Likewise the motor unit and container may be used in a refrigerator having any number of trays by using a container of such depth that when it is attached to its motor unit will just fill the box 6 of the expander unit.

Referring to Figs. 3 and 4, the motor unit 10 is provided with two opposite outwardly-disposed shoulders 80 which are adapted to support the motor unit on two of the inwardly disposed ledges 7 of the box 6 of the expander unit. The motor unit 10 is also provided on each side at its rear with a pendant arm 81 provided at its lower end with an outwardly disposed shoulder 82 adapted to support the rear of the motor unit on the ledges 7. One of these pendant arms 81 with a shoulder 82 may be seen in Fig. 4 on one side of the motor unit, and it will be understood that the opposite side of the motor unit is provided with a similar pendant arm 81 and shoulder 82 for the same purpose.

Referring to Figs. 2 and 4, the front of the motor unit 10 is provided with a front panel 83 extending slightly above and to either side of the motor unit, and adapted to aid in closing the front opening of the box 6 of the expander unit. A handle 84 is mounted on the front panel 83.

A swinging apron 68 of a height corresponding to the depth of the container used, is detachably connected to the front panel 83 of the motor unit 10, for the purpose of closing the remainder of the front of the box of the evaporator unit when the device is in use.

Referring to Fig. 1, the device will be seen in place and ready for operation. I prefer to have an electric outlet socket 65 mounted in an inner wall of the refrigerator, and electrically connected to a similar socket 66 mounted in the outer wall, with a switch 67 electrically interposed therebetween. In this case, the socket 66 may be connected to a source of electric power, and the plug connector 20 of the motor unit plugged into the outlet socket 65. However, if it is desired not to employ the sockets 65 and 66 in the refrigerator wall, an electrical connector adapted to engage with plug connector 20 may be placed loosely in any convenient location in the refrigerator, and an electric cord run therefrom out through one of the ventilating openings of the refrigerator, to the source of power.

Current may also be conveyed to the motor unit by an electric cord temporarily run through the refrigerator door space, the door being left slightly ajar.

It will be seen that this invention provides an exceedingly compact structure which is capable of use in the freezing compartments of modern household refrigerators.

In operation, the substance to be frozen is placed in the container 11, the stirrer 12 inserted, the lid 47 placed on the container, the container attached to the motor unit by means of the snap fasteners 60, the square upper head 38 of the stirrer shaft 39 engaging in the socket member 36 of the motor unit. The motor unit and container are then placed in the box 6 of the freezing compartment of the refrigerator, and current is turned on to operate the motor 16, which in turn drives the adjacent chain of reducing gears to operate the stirrer. Should the substance become frozen hard, the cup-shaped member 30 will slip relatively to the socket member 36 and prevent overstraining or stalling the motor and gears.

Having thus described the invention, what is claimed as new and desired to be secured by Letters Patent is:

1. Dessert-freezing apparatus comprising a top-opening container for substance to be frozen, a stirrer within the container, an electrical motor for causing relative movement of the stirrer and container, means fastening the motor to the container so that the motor and container may be handled as a unit, said motor being disposed at one side of the container not directly above or below the container, whereby the container is suitable to be inserted within the ice making compartment of a household refrigerator with the top of the container uppermost.

2. Dessert-freezing apparatus comprising a top-opening container for substance to be frozen, a rotary vertically disposed stirrer within the container, an electrical motor for causing relative movement of the stirrer and container, means fastening the motor to the container so that the motor and container may be handled as a unit, said motor being disposed at one side of the container not directly above or below the container, whereby the container is suitable to be inserted within the ice making compartment of a household refrigerator with the top of the container uppermost.

3. In combination, a receptacle comprising walls which close the receptacle on all sides except one vertical side, means for abstracting heat from the space enclosed by said receptacle through a wall of the receptacle, a container adapted to hold substance to be frozen within the receptacle, said container being capable of being opened at the top and being permanently closed on its other sides, stirring means within said container, an electrical motor at one side of said container and associated therewith for operating said stirring means, said motor and said container being movable as a unit in a horizontal direction with respect to said receptacle for removal of the container from the receptacle.

4. In combination, a receptacle comprising walls which close the receptacle on all sides except one vertical side, means for abstracting heat from the space enclosed by said receptacle, a container adapted to hold substance to be frozen within the receptacle, said container being capable of being opened at the top and being permanently closed on its other sides, a rotary stirrer vertically disposed in said container, an electrical motor at one side of said container and associated therewith for operating said rotary stirrer, said motor and said stirrer being movable as a unit in a horizontal direction with respect to said receptacle for removal of the container from the receptacle.

In testimony whereof I hereunto affix my signature.

CLARENCE H. PORTER.